United States Patent [19]

Kale

[11] Patent Number: 5,054,437
[45] Date of Patent: Oct. 8, 1991

[54] STORAGE TANK FOR WATER HEATERS AND THE LIKE WITH COLLECTOR OUTLET DIP TUBE

[76] Inventor: Hemant D. Kale, 8253 Sugarland Dr., Manlius, N.Y. 13104

[21] Appl. No.: 555,739

[22] Filed: Jul. 20, 1990

[51] Int. Cl.⁵ ............................................. F22B 5/00
[52] U.S. Cl. ................................... 122/13.1; 122/16; 122/361
[58] Field of Search ................ 122/17, 13.1, 367 R, 122/459, 361; 165/104.19, 153, 162

[56] References Cited

U.S. PATENT DOCUMENTS

| | | |
|---|---|---|
| 787,909 | 3/1905 | Fox . |
| 1,689,935 | 10/1928 | Shuell . |
| 2,207,057 | 7/1940 | Gulick . |
| 2,311,469 | 2/1943 | Pruitt . |
| 2,625,138 | 1/1953 | Jacoby . |
| 2,708,914 | 5/1955 | Cooper . |
| 2,809,267 | 10/1957 | Schauer, Jr. . |
| 2,833,273 | 5/1958 | Miller . |
| 3,244,166 | 4/1966 | Miller . |
| 4,436,058 | 3/1984 | McAlister . |
| 4,474,139 | 10/1984 | Dobias .................... 122/16 |
| 4,480,590 | 11/1984 | Rhodin ................. 122/13.1 |
| 4,739,728 | 4/1988 | Kale ..................... 122/13.1 |
| 4,940,024 | 7/1990 | Grabietz ............... 122/361 |
| 4,949,680 | 8/1990 | Kale ..................... 122/13.1 |

*Primary Examiner*—Henry C. Yuen
*Attorney, Agent, or Firm*—John C. Shepard

[57] ABSTRACT

A storage tank having a vertical, cylindrical tank, a fluid inlet, and a fluid outlet, includes a collector outlet dip tube for collecting hot fluid evenly across a horizontal cross section of the tank and thereby foil convection currents that cause mixing of hot and cold fluid so that more hot fluid is recovered at the outlet over time. A dispersing inlet dip tube may be also employed to introduce cold fluid evenly. The tank may comprise a hot water heater where the water stored in the tank is heated within the tank by means disposed internally or externally of the internal storage chamber. Alternately, the water may be heated externally of the tank and stored within the tank.

16 Claims, 5 Drawing Sheets

STORAGE TANK FOR WATER HEATERS AND THE LIKE WITH COLLECTOR OUTLET DIP TUBE

BACKGROUND OF THE INVENTION

1. Technical Field

This invention relates generally to storage tanks for hot fluids and, more particularly, to hot water storage tanks such as water heaters.

2. Background Art

In the prior art, a storage-tank water heater replaces hot water withdrawn from the top of the tank with cold water delivered to the bottom of the tank. Because typical tank heating elements cannot heat the water as fast as it is withdrawn, cold water will eventually fill the tank. Even before the tank is filled with cold water, the incoming cold water mixes freely with the heated standing water in the tank thereby causing deterioration of the tank's water temperature. This mixing is partially the result of the currents generated by the inward flow of cold water, by the outward flow of hot water, and by the convection currents established within the tank.

Because of this mixing, hot water delivered by a typical hot water heater will gradually decrease in temperature while water is being withdrawn, only a small amount of high temperature water is delivered relative to the tank's total capacity. The hot water volume delivered to the outlet above a specified temperature can obviously be extended by increasing the size of the tank or by increasing the BTU input of the heating elements or gas/oil burner. The temperature of hot water at the outlet can also be maintained by preventing the mixing of hot and cold water within the tank.

Attempts have been made in the past to contain and control the mixing of hot and cold water by providing separate chambers within the tank for cold and hot water. Miller U.S. Pat. Nos. 2,833,273 and 3,244,166 employ separate chambers within the tank at the inlet. Gulick U.S. Pat. No. 2,207,057 uses a small baffle over the inlet to control mixing. Fox U.S. Pat. No. 787,909 shows the use of a movable barrier.

McAlister U.S. Pat. No. 4,436,058 attempts to minimize convection tendencies by confining water in numerous capillary type conduits stretched between the tank bottom and the tank top. Schuell U.S. Pat. No. 1,689,935 attempts to obtain constant temperature of water by continuously varying the energy input to the tank by using a feedback control system involving a thermostat.

In substantially different constructions employing the concept of compartmentalization, Jacoby U.S. Pat. No. 2,625,138 divides the tank into a plurality of separate vertical layers by using numerous horizontal baffles and Pruitt U.S. Pat. No. 2,311,469 shows a fuel burner in which several secondary combustion chambers stratify the water in the storage tank.

In Schauer, Jr. U.S. Pat. No. 2,809,267, a braided tube is attached to the cold water inlet located adjacent the tank bottom to control the turbulent introduction of cold water into the tank and in an attempt to maintain the stratification of hot water above cold water.

While these prior art designs tried to reduce flow created by the usual high velocity of incoming cold water and tried to separate hot and cold water layers, none have taken note of the existence of possible convection currents and, thus, none limit the formation of these thermal currents in the tank and concurrently preserve the smooth horizontal boundary layer between hot and cold water within the tank. Further, these convection thermal currents are believed to flow primarily along the smooth side surfaces of the tank. In pressurized tanks, these currents are enhanced by the smooth inner surface of the curved top, the "domed" top being common in pressure tanks because of their structural strength. These closed loop currents greatly enhance the mixing of hot and cold water. My U.S. Pat. Nos. 4,632,065 and 4,739,728 attempt to stop mixing caused by these convection currents.

In these patents, the mixing is prevented in a more active manner by presenting a physical obstruction to the convection currents. Whereas, the invention disclosed herein prevents mixing in a more passive manner by foiling convection currents by use of a collector outlet dip tube. In contrast to the single point outlet presently employed in heaters, the collector dip tube collects water evenly across a horizontal cross section of the tank. In this way, the possibility that upward moving currents will reach the tank top and be deflected outward and downward are minimized. This in effect foils the convection currents that will otherwise be established within the tank which cause mixing. This aspect of minimizing mixing by use of collector outlet dip tube is novel, unique and very cost effective.

SUMMARY OF THE INVENTION

The present invention is directed to overcoming one or more of the problems as set forth above.

According to the present invention, a storage tank has a collector outlet dip tube which collects hot water evenly across the top of the tank. As the water is being withdrawn from the tank, it is withdrawn from a cross section of the tank, minimizing any currents in the body of the water, which in the absence of the collector dip tube would move upward and be deflected outward and downward along the tank wall. By minimizing these currents which cause mixing, the smooth boundary layer between the hot water and the incoming cold water is maintained. Thus, more hot water is withdrawn from the tank.

In one exemplary embodiment of the invention, a collector outlet dip tube having a circular cross section is utilized with a conventional hot water heater and is secured in hanging position within the top portion of the tank and communicates with the tank outlet. Numerous openings are provided in dip tube for withdrawing hot water from the tank from a plurality of locations near the top of the tank.

In other exemplary embodiments of the invention, the collector outlet dip tube is constructed so that the water accumulating or collecting portion is furcated, or spider-shaped to position the intake openings of the outlet dip tube in spaced relation across a cross section of the top of tank's internal storage area.

In another embodiment of the invention, a dispersing inlet dip tube is configured and disposed within the tank's internal storage area so that cold water is introduced to the tank from a plurality of points and dispersed evenly across the bottom thereof.

A feature of the invention is that the material and the shape of the dip tube may vary to suit the application. A material similar to that comprising that of the inlet dip tube would be appropriate, including heat resistant thermoplastic. The openings defined in the collecting portion of the dip tube may be of any suitable size and shape and may vary in quantity to permit hot water to be withdrawn evenly so as to minimize convection currents.

An advantage of the invention is that the tank will deliver more hot water, in gallons, at a relatively high temperature. A further feature of the invention is the minimization of the mixing of hot and cold water within the tank by the simplest and least expensive means possible.

BRIEF DESCRIPTION OF THE DRAWINGS

The details of construction and operation of the invention are more fully described with reference to the accompanying drawings which form a part hereof and in which like reference numerals refer to like parts throughout.

In the drawings.

DESCRIPTION OF THE PREFERRED EMBODIMENTS

Best Modes for Carrying Out the Invention

Figure 1:
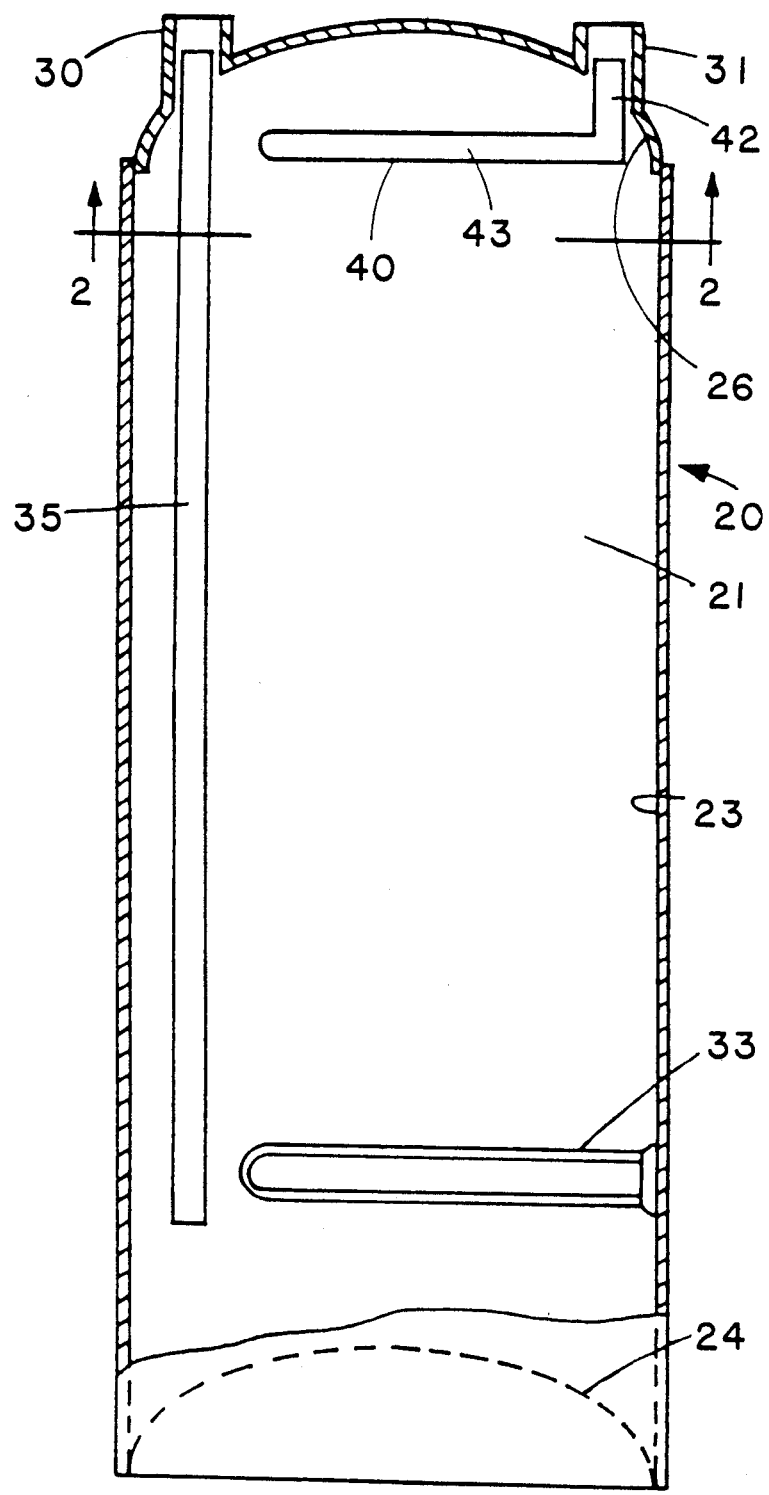
FIG. 1 is a side elevational view, partially in section, of a first embodiment of the present invention showing the use of the collector outlet dip tube in a water heater storage tank.
Figure 2:
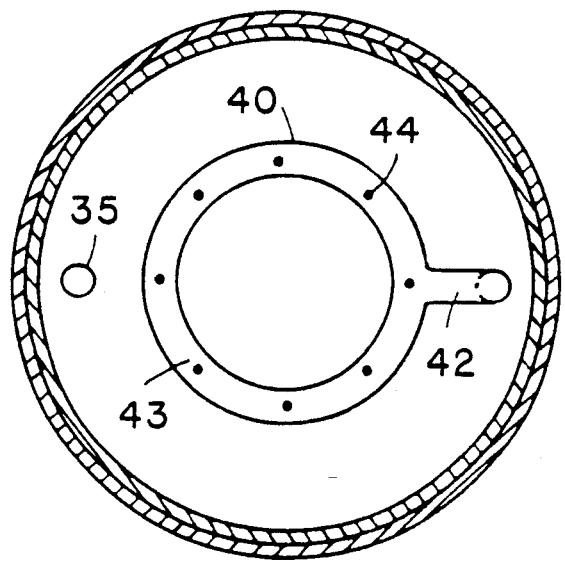
FIG. 2 is a cross-sectional view of the tank taken along line 2—2 of FIG. 1.

Referring to FIGS. 1 and 2 of the drawings, a conventional, non-compartmentalized hot water heater, generally designated 20, has a storage tank 21 with an upright, vertical axis. The internal hot water storage chamber of the tank 21 is defined by a cylindrical side wall 23, a bottom wall 24 and an outwardly concave top wall 26. The tank 21 has a cold water inlet 30 and a hot water outlet 31 generally adjacent the top thereof. Both the inlet 30 and the outlet 31 are radially spaced from the tank axis. The cold water inlet may be located adjacent to the tank bottom. As shown herein, electric heating elements 33 may be employed to heat the water within the tank. Alternately, the water may be heated externally and stored in the tank. The tank 21 may also have an opening 38 for a temperature-pressure relief valve.

When in operation, hot water is withdrawn from the top of the tank 21 by way of the outlet 31. Cold water replacing the water withdrawn is introduced to the tank 21 by way of the inlet dip tube 35.

In a first embodiment of the invention as shown in FIGS. 1 and 2, hot water is withdrawn through collector outlet dip tube 40 which communicates with the outlet 31. The collector dip tube 40 is positioned generally adjacent to the top of the tank 21 and may be hung from and secured to the outlet 31. The collector dip tube 40 has an outlet connecting portion 42 extending downward from the outlet 31 and a collecting accumulator portion 43 extending laterally from the outlet portion 42 horizontally around the tank axis across the top portion of the tank's internal storage area in a relatively thin horizontal plane. To effect the withdrawal of hot water across the tank's cross section, the collecting portion 43 is configured so as to extend to opposite sides of the tank axis. The collecting portion 43 is annular in shape and, in the embodiment shown in FIGS. 1 and 2, it is circular.

The collector dip tube portion 43 is provided with a plurality of openings, one of which is designated 44, adapted to deliver water from the tank's internal storage area to the interior of the dip tube 40. The multiple openings 44, which may be of any suitable size and shape and may vary in quantity, are spaced to provide for withdrawal of hot water in an even manner from multiple locations along a cross section of the tank. One method of accomplishing this is to space the openings 44 uniformly along the bottom portion of the collector dip tube 40 so that they are disposed across a relatively thin horizontal cross section of the storage chamber. The openings 44 are thus more or less closely located along or about a common thin horizontal plane. Note that the openings 44 may be disposed on the bottom, top or the sides of the dip tube, or a combination of such positions. As a result, water is collected evenly from the top of the tank 21 and delivered to the outlet 31.

Figure 3:
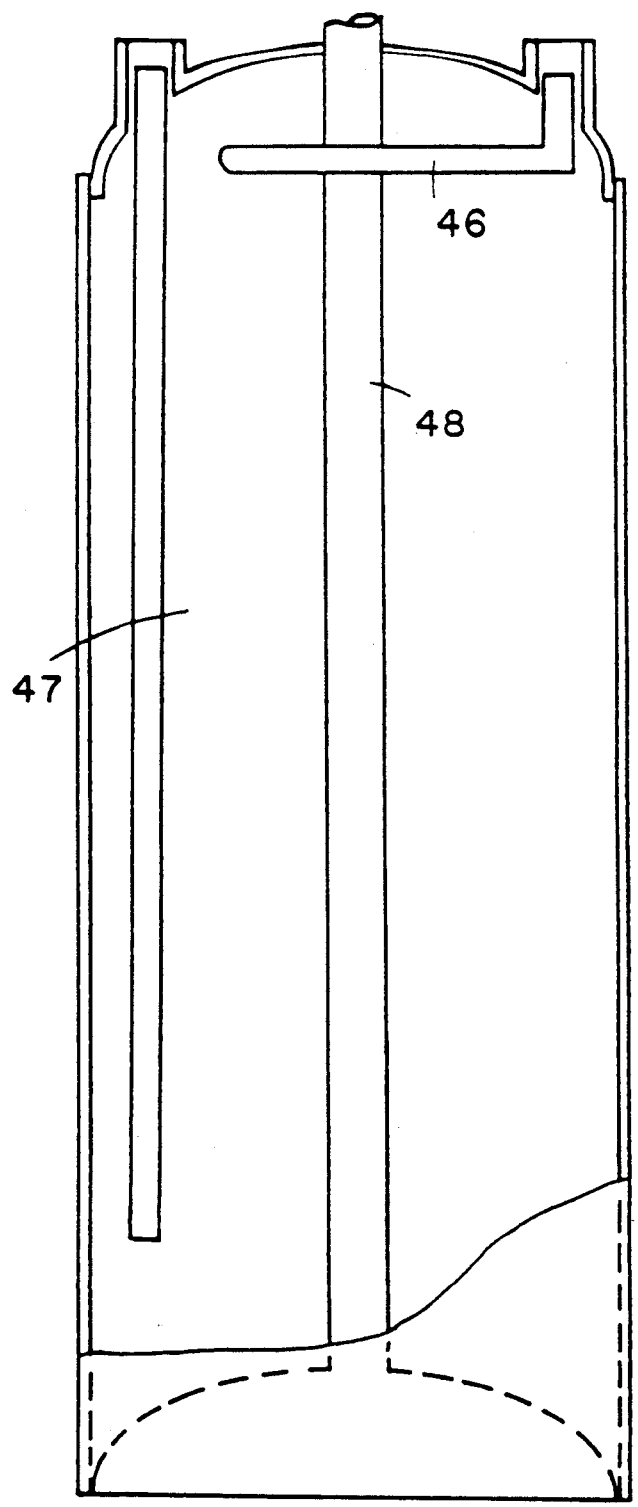
FIG. 3 is a side elevational view, partially in section, of a second embodiment of the present invention showing the use of the collector outlet dip tube in a gas water heater.

In a second embodiment of the invention shown in FIG. 3, a collector outlet dip tube 46, similar to that shown in FIGS. 1 and 2, is shown in use in a gas fired water heater 47 having a central exhaust flue 48.

Figure 4:
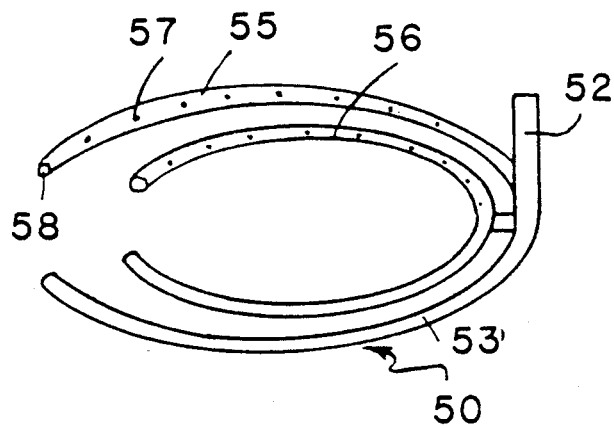
FIG. 4 is an enlarged, perspective view of another embodiment of a collector outlet dip tube.
Figure 5:
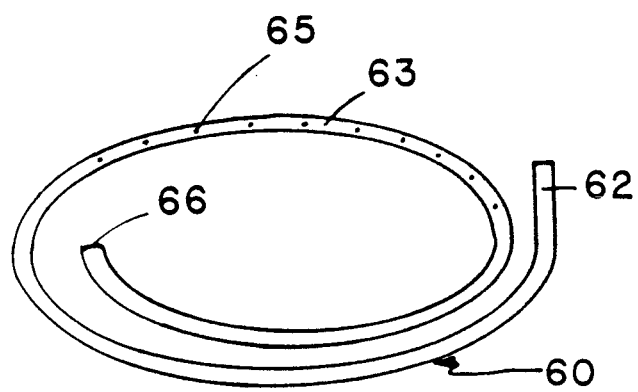
FIG. 5 is an enlarged, perspective view of another embodiment of a collector outlet dip tube.
Figure 6:
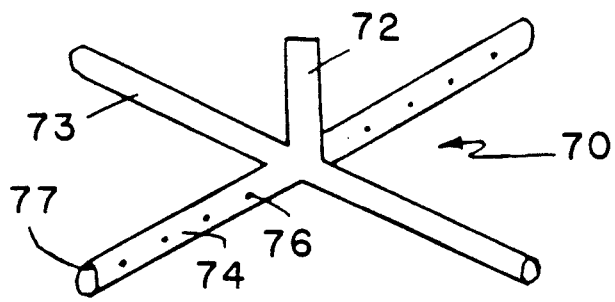
FIG. 6 is an enlarged, perspective view of another embodiment of a collector outlet dip tube.

FIGS. 4, 5 and 6 represent alternate shapes and forms of the collector outlet dip tube. In each embodiment, the dip tube openings withdraw hot water from one horizontal cross sectional area near the top of the water storage chamber thereby permitting even withdrawal of water for delivery to the tank outlet.

In FIG. 4, a collector dip tube 50 includes a connecting outlet portion 52 and a furcated collecting portion 53 extending from the outlet portion 52 with a pair of concentric bifurcated segments 55 and 56 extending horizontally around the tank axis from the outlet portion 52. The bifurcated segments 55 and 56 are provided with a plurality of spaced openings 57 permitting even withdrawal of water from the tank. The free ends, one of which is designated 58, of the collecting segments 55 and 56 are closed.

In FIG. 5, a collector dip tube 60 includes a connecting outlet portion 62 and a helical collecting portion 63 extending spirally from the outlet portion 62 horizontally around the tank axis. The helical portion 53 is provided with a plurality of openings 65 permitting withdrawal of water evenly from the tank. The free end 66 of the helical collecting portion 63 is closed.

In FIG. 6, a collector dip tube 70 includes a connecting outlet portion 72 and a spider-shaped collecting portion 73 with horizontal branch segments, one of which is designated 74, extending outward from the outlet portion 72. The outlet portion extends from the tank outlet to a point on the tank axis so that the branch segments 74 are radially arranged in the tank top. The branch segments 74 are provided with a plurality of spaced openings 76 permitting withdrawal of water evenly from the tank. The free ends, one of which is designated 77, of the branch segments 74 are closed.

Figure 8:
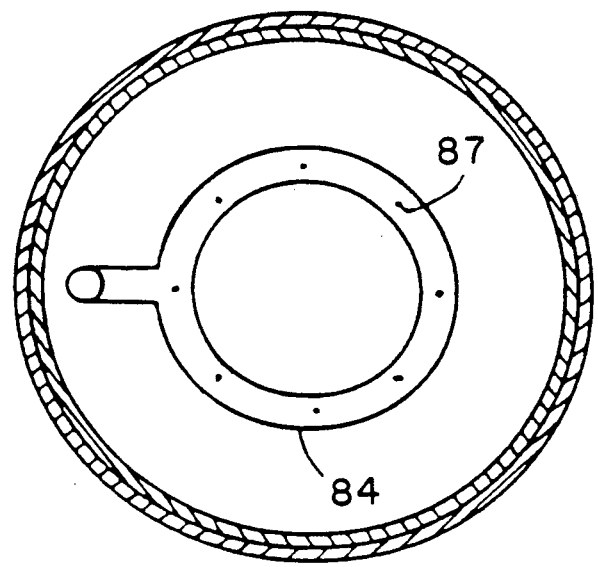
Figure 7:
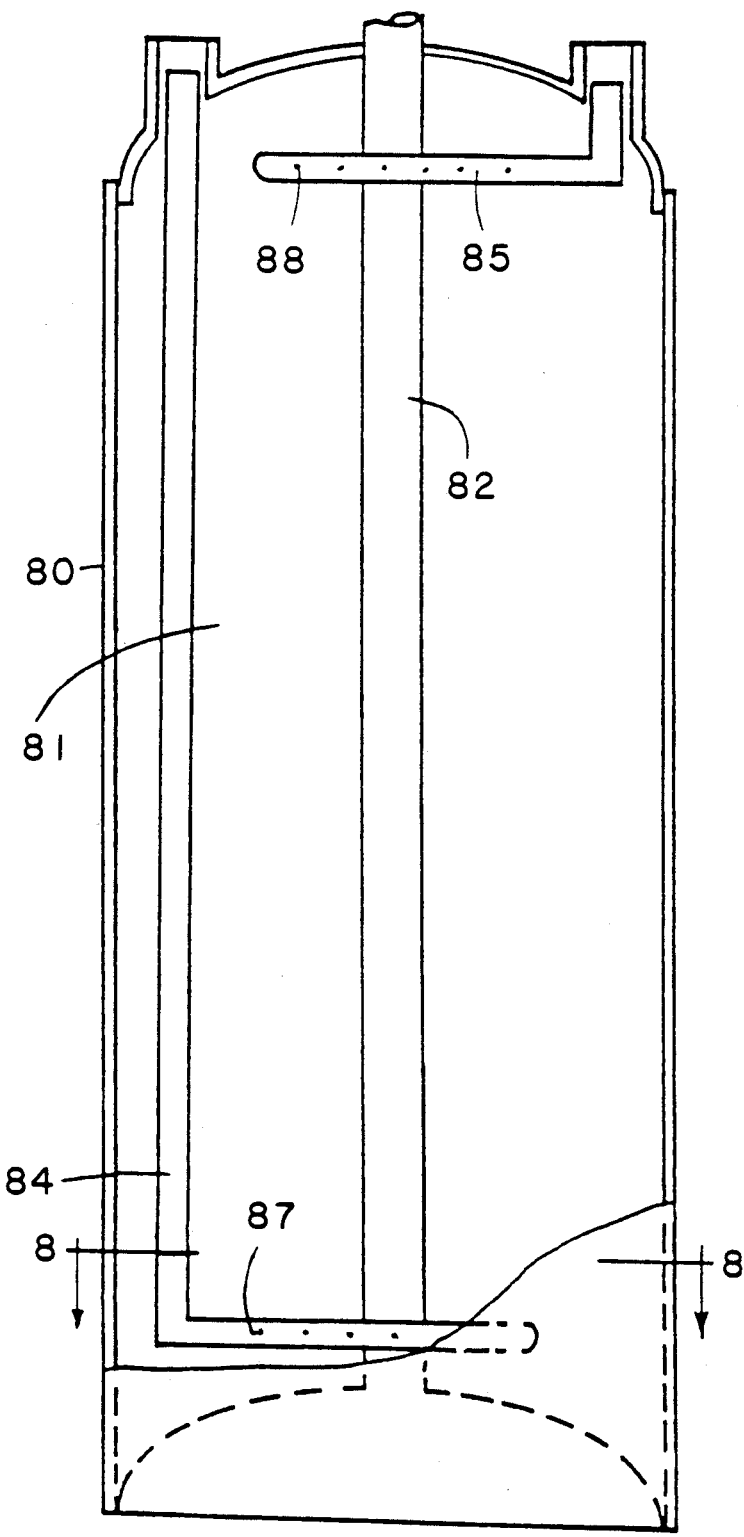
FIG. 7 is a side elevational view, partially in section, of a gas water heater similar to FIG. 3, but showing a dispersing inlet tube; and, FIG. 8 is a cross-sectional view of the tank taken along line 8—8 of FIG. 7 showing an exemplary embodiment of the dispersing inlet tube.

In FIGS. 7 and 8, another embodiment of the invention is shown. Herein, a gas fired water heater, generally designated 80, has a tank 81 with a central exhaust flue 82, a dispersing inlet dip tube 84 and a collector outlet dip tube 85. The inlet dip tube 84 communicates with the tank inlet and is disposed generally adjacent the bottom of the tank storage area. The inlet dip tube 84 extends across the internal storage area and has a plurality of openings 87 adapted to deliver fluid to tank 81. The outlet dip tube 85 is disposed generally adjacent the top of the tank storage area and communicates with the tank outlet. The outlet dip tube 85 extends across the internal storage area in a relatively thin horizontal plane and has a plurality of openings 88 adapted to deliver fluid from the internal storage area to the interior of the outlet dip tube 85. It is noted that the inlet dip tube 84 may be formed in any of the shapes described above for outlet tip tubes and may be configured similarly to the shape of outlet dip tube used.

In a heater having a dispersing inlet dip tube and a collector outlet dip tube as shown in FIGS. 7 and 8, inlet fluid is introduced from a plurality of points defined by the dispersing inlet dip tube 84 along a relatively thin horizontal cross section of the tank 81 and outlet fluid is collected from a plurality of points defined by the collector outlet dip tube 85 along a relatively thin horizontal cross section of the tank 81 and delivered to the outlet of the tank 81. As was noted above with respect to inlet dip tubes, the openings in the dispersing inlet dip tube may be positioned on the top, bottom or sides of the tube.

Industrial Applicability

From the foregoing, it should be apparent that the storage tank described herein is simple and inexpensive, yet provides a convenient and reliable means for delivering more hot water from the tank outlet at a relatively higher temperature over an extended period of time.

Other aspects, objects and advantages of this invention can be obtained from a study of the drawings, the disclosure and the appended claims.

What is claimed is:

1. In a vertical storage tank having a side wall, a bottom wall and a top wall defining an internal storage area, an inlet for incoming fluid and an outlet for withdrawn fluid, the improvement comprising a collector outlet dip tube communicating with the outlet and disposed generally adjacent the top thereof, said outlet dip tube extending across the internal storage area in a relatively thin horizontal plane and having a plurality of openings adapted to deliver fluid from the internal storage area to the interior of said outlet dip tube, whereby outlet fluid is collected from a plurality of points along a relatively thin horizontal cross section of the tank and delivered to the outlet of the tank.

2. The storage tank of claim 1 wherein said collector outlet dip tube has a connecting portion communicating with the outlet and an annular portion with a plurality of openings for collecting fluid from the tank.

3. The storage tank of claim 2 wherein the outlet is spaced from the central axis of the tank and said annular portion extends around the tank axis.

4. The storage tank of claim 3 wherein said annular portion is circular and encircles the tank axis.

5. The storage tank of claim 1 wherein said collector outlet dip tube has a connecting portion communicating with the outlet and a furcated portion with a plurality of openings for collecting fluid from the tank.

6. The storage tank of claim 5 wherein the outlet is spaced from the central axis of the tank and said furcated portion extends around the tank axis.

7. The storage tank of claim 1 wherein said collector outlet dip tube has a connecting portion communicating with the outlet and a helical portion with a plurality of openings for collecting fluid from the tank.

8. The storage tank of claim 7 wherein the outlet is spaced from the central axis of the tank and said helical portion extends around the tank axis.

9. The storage tank of claim 1 wherein said collector outlet dip tube has a connecting portion communicating with the outlet and a spider portion with a plurality of segments extending outwardly from said connecting portion with a plurality of openings for collecting fluid from the tank.

10. The storage tank of claim 9 wherein the outlet is spaced from the central axis of the tank, said connecting portion extends from the outlet to the axis, and said spider segments extend radially outward from the tank axis.

11. The storage tank of claim 1 wherein said collector dip tube has a connecting segment communicating with the outlet and at least one collecting segment with one end extending from said connecting portion and terminating in a free end, said collecting segment having a plurality of openings for collecting fluid from the tank.

12. The storage tank of claim 1 wherein said collector dip tube has a portion extending substantially horizontally across the top of the tank with the openings being defined in the bottom of the horizontal portion.

13. The storage tank of claim 1 wherein said collector dip tube has a portion extending substantially horizontally across the top of the tank with the openings being uniformly defined in the horizontal portion along a horizontal plane so that fluid is withdrawn evenly from the top of the tank.

14. The storage tank of claim 1 wherein the tank is pressurized and said collector outlet dip tube has a connecting portion communicating with the outlet and a collecting portion extending laterally from said connecting portion to opposite sides of the tank storage area, said collecting portion being positioned generally adjacent the top of the tank within the internal storage area in a relatively thin horizontal plane and having a plurality of spaced openings adapted to withdraw heated fluid evenly from the top portion of internal storage area, whereby outlet fluid is collected from a plurality of points along a relatively thin horizontal cross section of the tank and delivered to the outlet of the tank.

15. The storage tank of claim 1 wherein the tank is a pressurized water heater defined by a cylindrical side wall having a diameter between 12 and 26 inches, a bottom wall and a curved top wall and having a noncompartmentalized internal storage area, means for heating water within the tank, a cold water inlet and a hot water outlet generally adjacent the top thereof, and wherein said collector outlet dip tube has a connecting portion communicating with the outlet and a collecting portion extending laterally from said connecting portion to opposite sides of the tank storage area, said collecting portion being positioned generally adjacent the top of the tank within the internal storage area in a relatively thin horizontal plane and having a plurality of spaced openings adapted to withdraw hot water evenly from the top portion of internal storage area, whereby outlet water is collected from a plurality of points along a relatively thin horizontal cross section of the tank and delivered to the outlet of the tank.

16. The storage tank of claim 1 further including a dispersing inlet dip tube communicating with the inlet, said inlet dip tube being disposed generally adjacent the bottom of the storage area and extending across the internal storage area in a relatively thin horizontal plane with a plurality of openings adapted to deliver fluid to the internal storage area, whereby inlet fluid is introduced from a plurality of points along a relatively thin horizontal cross section of the tank.

* * * * *